United States Patent [19]

Bergkvist

[11] 4,272,191
[45] Jun. 9, 1981

[54] DEVICE FOR INDICATING A PARTICULAR ANGLE IN PIPELAYING WORK OR SIMILAR OPERATIONS

[76] Inventor: Lars A. Bergkvist, Gottne, 890 42 Mellansel, Sweden

[21] Appl. No.: 41,416

[22] Filed: May 22, 1979

[30] Foreign Application Priority Data

May 31, 1978 [SE] Sweden .............................. 7806332

[51] Int. Cl.³ .............................................. G01B 11/27
[52] U.S. Cl. ........................................ 356/153; 33/286; 356/399
[58] Field of Search ................ 356/153, 241, 374, 375, 356/395, 399, 401; 250/237 G; 33/286

[56] References Cited

U.S. PATENT DOCUMENTS

| | | | |
|---|---|---|---|
| 3,572,942 | 3/1971 | Tekronnie et al. | 356/375 |
| 3,604,813 | 9/1971 | Tekronnie et al. | 356/375 |

*Primary Examiner*—Richard A. Rosenberger
*Attorney, Agent, or Firm*—LeBlanc, Nolan, Shur & Nies

[57] ABSTRACT

A device for indicating an angle or direction of pipes in pipelaying operations in which two screen units are disposed in a predetermined spaced relation in a housing placed in a pipe section to measure the angle of the pipe. The two screen units each have opaque lines separated by transparent gaps, the opaque lines being in the form of concentric circles of the screens being disposed in the housing with the circles of both screens being mutually concentric. When observing the pattern through the screens, the circles of the two screens form interference patterns, i.e., moire patterns representative of the angle of the device relative to line of sight of the viewer.

6 Claims, 9 Drawing Figures

U.S. Patent   Jun. 9, 1981   4,272,191
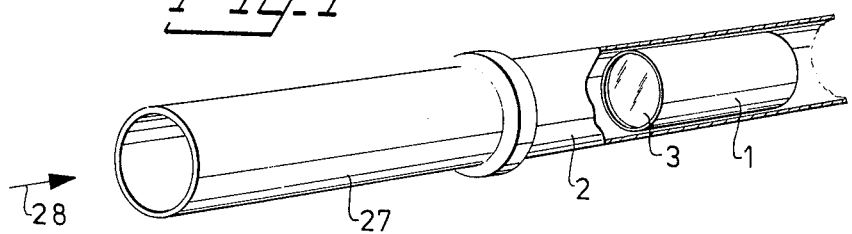
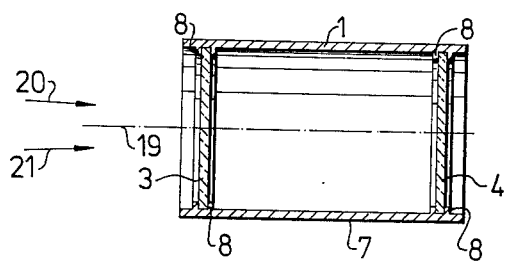
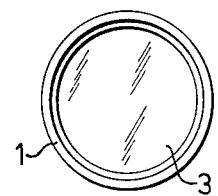
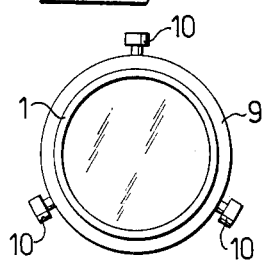
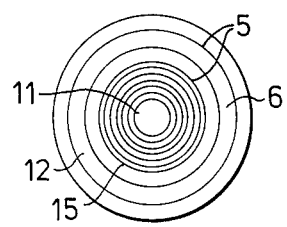
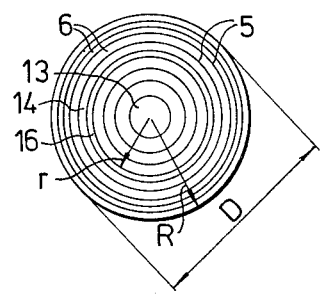
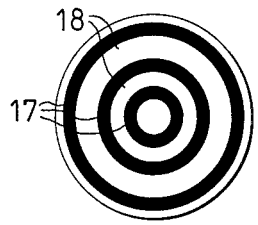
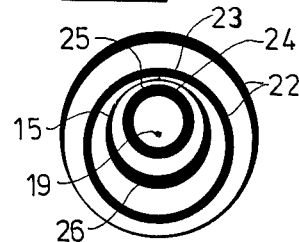
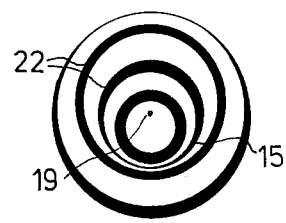

DEVICE FOR INDICATING A PARTICULAR ANGLE IN PIPELAYING WORK OR SIMILAR OPERATIONS

BACKGROUND OF THE INVENTION

The invention presented here refers to a device for indicating a particular angle in pipelaying work or similar operations.

In pipelaying work it is difficult to position the pipes which form a pipeline in a straight line and with a certain inclination, i.e. at a particular angle to the horizontal plane.

In order to obtain a particular inclination in all the pipe sections included in a pipeline so that the pipeline forms a straight line, relatively complicated measuring equipment is required.

A device as per the invention presented here considerably facilitates pipelaying at the same time as an extremely precise indication is provided of the inclination of the pipes incorporated in the pipeline relative to a particular pre-determined angle of inclination.

Thus the invention presented here refers to a device for the indication of a particular angle or direction in pipelaying work or similar operations. The invention is characterized by two screen units, comprising screens consisting of opaque lines separated by transparent gaps, being positioned at a certain distance from one another, where the opaque lines of the screen are in the form of concentric circles, and by the screens being mutually concentrically positioned.

The invention is described in more detail below in connection with the appended drawing, where FIG. 1 shows schematically a device as per the invention in connection with a pipe.

FIG. 2 shows schematically the device in a cross-section through its longitudinal axis.

FIG. 3 shows the device viewed from the left in FIGS. 1 and 2.

FIG. 4 shows one design of the device.

FIG. 5 shows one of two screens included in the device.

FIG. 6 shows a second of the two screens included in the device.

FIGS. 7-9 show various interference patterns which appear in various angles of observation.

FIG. 1 shows a device 1 as per the invention positioned in a partially opened pipe 2.

FIG. 2 shows a cross-section along the device's longitudinal axis. The device 1 comprises two screen units 3, 4, which preferably comprise two discs. The screen units 3, 4 comprise screens consisting of opaque lines 5 separated by transparent gaps 6. The opaque lines 5 of each screen are as i.a. shown in FIGS. 5 and 6 in the form of circles where each opaque circle 5 is concentric with the other circles in a screen.

The opaque lines' 5 width exceeds the width of the transparent gaps 6.

The two screen units 3, 4 are positioned at a certain mutual distance in a housing 7 and fixed by means of suitable arrangements 8, for example grooves in the inner wall of the housing 7. In addition the screen units are so placed that the screens are mutually concentrically positioned.

The distance between the screen units is preferably 1 to 3 times the maximum diameter D of one screen.

The device 1 is intended to be placed in a pipe 2 or at one end of a pipe, for example by a well from which a pipeline is to be laid. In accordance with one design the device 1 is designed with an outer diameter suited to a certain pipe dimension so that it can be placed concentrically in the pipe, whereby the device viewed from the left in FIG. 2 has the appearance shown schematically in FIG. 3. However, in accordance with another design the device 1 can be fitted with a sleeve 9 positioned concentrically on the outside either arranged so that its outer diameter primarily tallies with the inner diameter of a pipe, in which it is to be placed, or fitted with a number of radially adjustable mounts 10 pointing outward intended to lie against the inside of a pipe, in which the device is to be placed. The mounts are evenly spaced around the periphery of the sleeve 9.

When observing one of the device's 1 screen units 4 through the other screen unit 3 the two screens' opaque lines 5 and transparent gaps 6 respectively will interact to form interference patterns, so-called moire patterns. FIGS. 7, 8 shows such moire patterns.

The moire pattern which appears in different observations is dependent on the screens' 3,4 division, i.e. the number of opaque lines 5 per unit of length perpendicular to the lines 5.

In accordance with a preferred design each screen unit's screen 3 and 4 respectively is divided into two concentric sections 11,12,13,14, where different divisions exist in the two sections existing on a screen unit. The sections 11,12 and 13,14 respectively consist therefore of an inner section 11 and 13 respectively and an outer section 12 and 14 respectively, where the borderline between the sections consists of a circle 15 and 16 respectively. The radius r of this circle 15 and 16 respectively preferably corresponds to a fourth to half the screen's maximum radius R.

In addition in accordance with the last mentioned design the first screen unit 3 is provided with a closer division, i.e. a larger number of opaque lines 5 per unit of length perpendicular to the lines 5, in the inner section 11 than in the outer section 12, and the other screen unit 4 is provided with the same division in its inner section 13, as in the first screen unit's 3 outer section 12 and the same division in its outer section 14, as in the first screen unit's 3 inner section 11. FIGS. 5 and 6 show the two screen units 3,4 schematically and with schematically drawn opaque lines 5.

The width of the opaque lines 5 is preferably the same in all the said four sections 11,12,13,14 of the screen units' 3,4 screens. The width of the lines 5 can to a certain extent be selected dependent on the unit's size, but a preferred width is 0.5–1.5 mm. As mentioned above the width of the transparent gaps 6 is less than the width of the opaque lines 5.

When viewing a device in accordance with the said design in a direction coinciding with the device's longitudinal axis, i.e. along the centre line 19 of the screen units 3,4 the interference pattern which is shown in FIG. 7 schematically and which consists of concentrically positioned broad dark rings 17 separated by light gaps 18 will appear. The rings 17 are considerably broader than each individual opaque line 5. When the device 1 is viewed in a direction which forms a certain angle with the screen units' centre line direction, an unsymmetrical moire pattern will be formed as shown in FIGS. 8 and 9, that likewise includes dark strips 22.

FIG. 8 shows schematically a moire pattern, which is formed with the above mentioned divisions when the device 1 is viewed along a direction beneath the centre line 19, as indicated by arrow 20 in FIG. 2. The moire pattern formed when the device 1 is viewed from a direction above the centre line 19, as indicated by arrow 21 in FIG. 2 is shown in FIG. 9. A characteristic part of the moire pattern when viewing the device 1 from a direction forming an angle with the centre line 19 is that the dark strips 23,24 come closer together at a point 25 on the border which is comprised by circle 15 described by radius r, and move further apart at a diametrically opposite point 26 along circle 15. The point 25 where the dark strips come closer together lies in a plane from the centre line 19 through a line coinciding with the direction of viewing. Thus observation provides information on whether the viewer is viewing the device 1 in a direction coinciding with the centre line 19 or is viewing it in a direction forming an angle with the centre line 19, and in the latter case also provides information on which plane the direction of viewing is located in. In the example shown in FIG. 8 the said plane therefore is a vertical plane from the centre line and upward, and in that shown in FIG. 9 from the centre line 19 and downward.

When using the device 1, the device 1 is placed in a pipe or at one end of a pipe whereby this pipe is carefully aligned by means of other known aligning instruments. When the next pipe 27 is fitted to the first pipe's 2 other end, the attached pipe 27 is aligned by the device 1 being viewed through the free end of the attached pipe 27, as indicated by arrow 28. In this context this pipe's 27 position is adjusted until a moire pattern comprising concentrically positioned dark strips 17, see FIG. 7, appears in the device. Hereafter another pipe is fitted to the last mentioned pipe 27 etc while the device 1 remains in its original position.

The invention presented here therefore permits a precise indication to be obtained with regard to the inclination of the pipes in the pipeline relative to a particular pre-determined angle of inclination. Thus pipelaying is considerably facilitated by the invention presented here.

The invention presented here must not be considered restricted to the design stated above, but can be varied within the framework given in its appended patent claim. For example the screen division on the two screen units can be another than that described. Each and every one of the screen units can, for example, be fitted with a screen with one division likewise screens with more than two divisions. In addition the device 1 described above can be designed in such a way that the two screen units are interchanged whereby viewing of the first screen unit is effected through the second screen unit.

I claim:

1. Device for indicating a particular angle or alignment in pipelaying work or similar, characterized by the fact that two screen units (3,4) comprising screens consisting of opaque lines (5) separated by transparent gaps (6) are at a certain distance from each other, where each screen's (3,4) opaque lines (5) are in the form of concentric circles, and by the fact that the concentric circles of the two screens (3,4) are mutually concentrically positioned.

2. Device as per claim 1, characterized by the fact that each and every one of the screen units (3,4) are fitted with screens with different division inside and outside respectively of a certain radius (r) which radius (r) preferably corresponds to a fourth to half the screen's maximum radius (R).

3. Device as per claim 2, characterized by the fact that one screen unit (3) is fitted with a screen with closer division (11) inside and wider division (12) outside said radius (r) while the other screen unit (4) is fitted with a screen with wider division (13) inside and closer division (14) outside said radius (r).

4. Device as per claim 1, 2 or 3, characterized by the fact that the width of the opaque lines (5) exceeds the width of the transparent gaps (6).

5. Device as per claim 4, characterized by the fact that the distance between the screen units (3,4) is one to three times a screen's maximum diameter.

6. Device as defined in claim 1, 2 or 3, wherein the distance between the screen units is one to three times the maximum diameter of a said screen unit.

* * * * *